United States Patent
Siebenhaar (10) Patent No.: US 12,465,207 B2
(45) Date of Patent: Nov. 11, 2025

(54) VIDEO LARYNGOSCOPE FOR MANAGING THE AIRWAY IN AN INDIVIDUAL IN NEED THEREOF

(71) Applicants: Luis Santos Spitale, Córdoba (AR); Guillermo Leonardo Siebenhaar, Provincia de Córdoba (AR)

(72) Inventor: Guillermo Leonardo Siebenhaar, Provincia de Córdoba (AR)

(73) Assignees: Guillermo Leonardo Siebenhaar, Provincia de Córdoba (AR); Luis Santos Spitale, Cordova (AR)

( * ) Notice: Subject to any disclaimer, the term of this patent is extended or adjusted under 35 U.S.C. 154(b) by 262 days.

(21) Appl. No.: 18/251,102

(22) PCT Filed: Oct. 29, 2021

(86) PCT No.: PCT/EP2021/080104
§ 371 (c)(1),
(2) Date: Apr. 28, 2023

(87) PCT Pub. No.: WO2022/090454
PCT Pub. Date: May 5, 2022

(65) Prior Publication Data
US 2023/0404384 A1    Dec. 21, 2023

(30) Foreign Application Priority Data
Oct. 30, 2020    (AR) .............................. P20200103008

(51) Int. Cl.
*A61B 1/267*    (2006.01)
*A61B 1/00*    (2006.01)
*A61B 1/05*    (2006.01)

(52) U.S. Cl.
CPC .......... *A61B 1/267* (2013.01); *A61B 1/00052* (2013.01); *A61B 1/00066* (2013.01); *A61B 1/0008* (2013.01); *A61B 1/05* (2013.01)

(58) Field of Classification Search
CPC .. A61B 1/267; A61B 1/00; A61B 1/05; A61B 1/00052; A61B 1/00066; A61B 1/06; A61B 1/0676; A61B 1/0008
See application file for complete search history.

(56) References Cited

U.S. PATENT DOCUMENTS 8,287,450 B1 * 10/2012 He ......................... A61B 1/267
                                                        600/193
2010/0249513 A1 * 9/2010 Tydlaska ............ A61B 1/00105
                                                        248/219.4

(Continued)

FOREIGN PATENT DOCUMENTS

| CN | 108095677 A2 | 6/2018 |
| EP | 2567725 A2 | 3/2013 |
| GR | 20180100390 A | 4/2020 |

OTHER PUBLICATIONS

International Search Report and Written Opinion for PCT/EP2021/080104 (Jan. 20, 2022).

*Primary Examiner* — Christopher J Beccia
(74) *Attorney, Agent, or Firm* — Merchant & Gould P.C.

(57) ABSTRACT

A video laryngoscope for managing the airway in an individual in need thereof, comprising: a substantially curved handle. The handle comprises an internal cavity which is open along its entire length on one of its sides and has a cap on the opposite side. Said cavity houses a blade of the video laryngoscope when it is folded over the handle, which is rotatably mounted to rotate 180° about the axis of symmetry of the handle by means of a pivot axis of a movable blade support that houses an automatic locking mechanism. The movable blade is connected to the support by means of a (Continued)

longitudinal slide and runs on the slide activating a lock of an extension-retraction mechanism. A monitor chassis is mounted at the proximal end of the handle that includes a TFT-LCD screen covered by a protective plate, the screen being connected to a printed circuit board comprising a plurality of image-adjustment controls and an on/off switch, connected respectively to four push-buttons sticking out through the monitor chassis. The board comprises a microprocessor with a video output port and a power source, the chassis comprises on the back of the monitor a housing for the articulated parts through a rotary coupling on a hollow axis with the handle of the laryngoscope; and the monitor is connected through the printed circuit board to a camera equipped with its own light arranged below the movable blade support.

18 Claims, 6 Drawing Sheets

(56) References Cited

U.S. PATENT DOCUMENTS

| | | | |
|---|---|---|---|
| 2011/0130627 A1 | 6/2011 | McGrail et al. | |
| 2012/0071725 A1* | 3/2012 | Plevnik | A61B 1/00052 600/188 |
| 2014/0296645 A1* | 10/2014 | McGrath | A61B 1/00101 600/196 |

* cited by examiner

VIDEO LARYNGOSCOPE FOR MANAGING THE AIRWAY IN AN INDIVIDUAL IN NEED THEREOF

This application is a National Stage Application of PCT/EP2021/080104, filed 29 Oct. 2021, which claims the benefit of priority to Application No. P20200103008, filed 30 Oct. 2020 in Argentina, which applications are incorporated herein by reference. To the extent appropriate, a claim of priority is made to each of the above- disclosed applications.

FIELD OF THE INVENTION

The present invention relates to the field of medical devices that provide access to the human larynx area, both in children and adults and particularly to be used in diagnostic and surgical procedures of the larynx, hypopharynx and proximal esophagus, as well as for the practice of orotracheal intubation using a cannula under anesthesia or in mechanical ventilation procedures. More particularly it refers to a laryngoscope. Even more particularly, it is directed to a video laryngoscope.

PRIOR ART

A laryngoscope is a simple medical device that was originally used primarily to examine the glottis and the vocal cords.

Opera singer and vocal pedagogue Manuel Garcia developed and used the first laryngoscope.

The introduction of this device for use in medicine is mainly owed to German physician Johann Czermak.

The use of laryngoscopes has been consolidating over the years to the point that they are currently used to perform diagnostic and surgical procedures of the larynx and laryngeal instrumentation both in the specific and extended use of orotracheal intubation with an endotracheal tube, including emergentology, intensive care and anesthesia as well as otorhinolaryngology, in a great variety of diagnostic and therapeutic applications.

Several constructions and designs of these devices have been used, but basically they consist of a metal blade attached as a support to a handle.

Laryngoscopes are inserted through the mouth of the patient, who is in a dorsal decubitus position, through the oropharynx to move the tongue upwards and enable access the exolarynx, supraglottis and hypopharynx; and onwards, by raising the tongue and epiglottis, to access the glottic area directly. It is then possible to perform intubation with tracheal cannulas through the larynx, as well as the most diverse diagnostic, surgical and therapeutic procedures.

Considering their viewing or imaging means, there are two large groups of laryngoscopes to access the larynx and its surrounding area. The first group uses direct human vision as an optical means. Good examples of this group of laryngoscopes are the McIntosh, Miller, Jackson-VVinsconsin designs, both with curved and straight blades. These designs vary in size, ergonomics and whether they use or not lamps or optical fiber light sources, but they share the same optical principle, i.e.the direct vision of the operator.

The second group of laryngoscopes are video laryngoscopes, which use endoscopic and video technology as a means of magnification and image visualization. They require the use of fiber optic and video endoscopic exocameras or micro cameras, integrated circuit boards and LCD screens as components of the device, which may include a blade, such as the C-Mac set of laryngoscopes sold by Storz and the IntuBrite VLS 6630 EDGE Plus video laryngoscope or not include a blade, such as the King Vision video laryngoscope (Ambu, Denmark).

Apart from these two large groups are the Airtraq optical laryngoscopes equipped with a mirror and prism system for image reflection and transmission to a viewer to facilitate the operator's vision.

In particular, Patent Application US2011130627A1, published on Jun. 2, 2011, entitled VISUALIZATION INSTRUMENT, describes a visualization instrument comprising a display support component removably coupled to a component insertable into a target space. The insertable component includes a camera providing images of the target space. Images are presented on a display device compatible with the display support component. The insertable component can be discarded after a permitted number of uses.

Patent Application EP2567725A2, published on Mar. 13, 2013, entitled TRACHEAL INTUBATION DEVICE, describes a tracheal intubation device for placing an endotracheal tube in the trachea of a patient. The tracheal intubation device includes a bar-shaped camera, a handle portion, a guiding portion, and a display device. The bar-shaped camera for capturing images is placed inside the endotracheal tube. The display device is electrically connected to the camera for displaying images captured by the camera. The guiding portion connected to the handle portion has a front end and a rear end, wherein the rear end is connected to the handle portion, and the camera and the endotracheal tube are movably situated in the guiding portion.

Patent Application CN108095677A, published on Jun. 1, 2018, entitled THE VIDEO LARYNGOSCOPE OF ADJUSTABLE ANGLE describes an adjustable angle video laryngoscope comprising eyeglass, a guide-localization slide bar, a rotation axis, a handle, a camera assembly system, a spring, link stopper, a slide-and-guide pin, and a push-button, characterized in that the handle is placed in the outermost side of the whole structure, the push-button is arranged on the left side of the upper portion outside the handle, the guide locating sliding rod is arranged on the lower portion of the sliding guide pin, and the camera component system is arranged on the inner side of the lens. Accordingly, a patient is examined by controlling the handle with one hand, the regular actions of pressing the push-button inwards and moving outwards are performed with the index finger, and by means of the lever principle, the guide locating sliding rod and the lens connected with the guide locating sliding rod are driven to rotate clockwise and anticlockwise to be adjusted to the proper angles and positions to meet the requirements. This device solves the problems caused by a traditional product that can only be adjusted to the appropriate angle through lifting and leveraging actions with a single arm, which is a tedious process, where posture is unlikely to be kept. The advantages of the angle adjustable video laryngoscope are the low manufacturing cost, its firmness and durability, and the flexibility of the connection of all its components.

Finally, patent application GR20180100390A, published on Apr. 15, 2020, entitled VIDEO LARYNGOSCOPE FOR INTUBATION, which describes a low-cost video laryngoscope made with 3D printing technology for quick, painless and easy patient intubation. It is potentially composed of a removable viewing camera/USB guide that can be connected to any mobile phone, tablet or computer and provides high-resolution image and video storage. In addition, it has a custom channel for the trachea. The tracheal channel and the camera housing are angled to be directed to the center of the trachea. The design of the handle takes into account the anatomical characteristics of the hands of the physician using the device.

These groups of laryngoscopes, to a greater or lesser extent, depending on the particular design, allow to view the laryngeal area, but at the expense of multiple designs of both curved and straight blades; and using multiple blade sizes, so it should be more appropriate to speak of a laryngoscopy set, with the difficulty that this means in handling devices in the case of laryngoscopes having a blade. In the case of those laryngoscopes not having a blade ("ablade"), such as King vision or Airtraq, different sizes of plastic cannulas-sleeves or even different sizes of laryngoscopes are required, which also involves certain inconveniences in handling, transportation and costs.

As a consequence of the aforementioned, it is necessary to optimize the design of the blade to improve laryngeal visualization and thus speed up and simplify the orotracheal intubation procedure, as well as to design a laryngoscope with a single extendable-retractable blade so as not to have to change blades with the operative difficulty that this involves, being able to easily adapt the length of the blade to the anatomy of the patient. There are also additional needs to improve the size of the laryngoscope, in order to optimize its transportation, and achieve a design that significantly reduces dispersion of aerosol particles and the contamination index of the operator during the procedure.

SUMMARY OF THE INVENTION

Therefore, the purpose of the present invention is to provide a video laryngoscope for airway management in an individual in need thereof, comprising:

a substantially curved handle, said handle comprising an internal cavity with an opening along the entire length on one of its sides and a cap on the opposite side, said cavity housing a blade of the video laryngoscope when it is folded over the handle, and is rotatably mounted so as to articulate 180° about the axis of symmetry of the handle about a pivot axis of a movable blade support that houses an automatic locking mechanism of the blade.

The blade comprises a movable blade that is overlappingly connected to the movable blade support by means of a longitudinal slide, said movable blade being movable along said slide by actuating a lock of an extension-retraction mechanism of the movable blade.

A monitor chassis is mounted at the proximal end of the handle, said monitor including inside it a TFT-LCD screen covered with a protective plate, the screen being connected to a printed circuit board comprising a plurality of image-adjustment controls and an on/off switch, connected respectively to four push-buttons sticking out through the monitor chassis. The plate comprises a microprocessor with a video output port and a power source, wherein on the rear side of the monitor the chassis comprises a housing for the articulated parts through a rotating coupling on a hollow shaft with the handle of the laryngoscope; and the monitor is connected through the printed circuit board to a camera comprising its own light located at the distal end of the movable blade support and on its lower side opposite to a slide.

Essentially, when the blade is deployed along the axis of symmetry of the handle, the position is fixed by the automatic locking mechanism with a lock released by means of an actuation button located at the distal end of the handle, on its lower side.

Especially, the proximal end of the laryngeal blade support arm extends towards the distal end, forming therebetween a curve with a 20 mm upper radius of curvature, a central portion constituting a blade body with a 110 mm upper radius of curvature, and a chisel tip describing a protrusion-like bulge followed by a bending at an angle of 20° between its 20 mm terminals and towards the upper radius of curvature of the 110 mm blade body.

Substantially, the T-shaped automatic lock of the blade is lying down and connected on its proximal end with three springs and on its distal end to a pivot axis on a circular plate, said pivot axis articulating with the handle through a rotating mechanism allowing a 180° rotation, said pivot axis being locked by a U-lock, wherein the pivot axis has two opposite slots, a deeper slot being connected to the extended blade and a shallower slot being connected to the folded blade.

Preferably, the automatic lock is traversed by an upper piston-shaped lock externalized below on the handle by a push-button for activating the mechanism and which is connected on its upper end to a spring.

More preferably, the piston-shaped lock and the actuation button are made of AISI 420, 316 L, 304, 303 Full Hard or ¾ Hard steel, the lying down T-shaped automatic lock and the U-lock are made of AISI 303 Full Hard or ¾ Hard steel, and the springs are made of AISI 303 or 308 steel.

In particular, the movable blade support comprises on its lower side a slot on a channel of the cable of the micro camera sealed by a cap welded to said slot.

Preferably, the extendable-retractable movable blade and the movable blade support are made of AISI 420, 316 L or 304 steel.

In particular, the lock of the extension-retraction mechanism of the movable blade comprises an actuation trigger connected through an intermediate lock to an internal cylindrical lock with an axial up and down movement perpendicular to the slide and movable blade, being connected this lock on its upper end to four flat hollow slots arranged on the lower side of the movable blade to adjust the length of the blade and connected on its lower end to a spring, this spring being connected to a threaded cap to seal the housing of the lock on its lower side.

Also preferably, the blade lock, the horizontal pin, and the lock trigger are made of AISI 420, 316 L, 304, 303 Full Hard or ¾ Hard steel, and the spring is made of AISI 303 or 308 steel.

Preferably, the printed circuit board comprises a mounted microprocessor connected to the power source, the micro camera that has associated micro LEDs for lighting, the video laryngoscope monitor screen, a video output port to send the information captured by the micro camera to an external device, wherein said microprocessor is controlled by a push-button panel to control a light intensity and brightness dimmer, a contrast control, an image orientation control, and an on/off switch.

Essentially, the body of the handle and the cap comprise between them a channel for the passage of a cable connecting the camera mounted on the laryngeal blade to the monitor screen, passing through the electrical circuit board.

Still preferably, the body of the handle and the cap are made of aluminum or aluminum alloy, preferably 7075-aluminum alloy (Zicral alloy), the cap being screwed to the body of the handle with flat head screws.

Also preferably, the rotary coupling of the monitor on a hollow axis with the body of the handle has a mobility of 60° in the anteroposterior direction of the monitor, and comprises interposed between the articulated rotary coupling of the handle and its respective housing on the rear side of the monitor two O-ring circular seals.

Preferably, also, the power source is a plurality of disposable AA-type lithium batteries or rechargeable AA-type lithium ion batteries located on the back of the screen.

Substantially, the camera is a high definition micro video camera comprising a plurality of high power and adjustable intensity micro LEDs.

Also substantially, the micro camera has a 0° direction angle of view, a 48° angle of view or FOV (Field Of View) and a 30 and 80 mm DOF (Deep of Field).

In addition, the distal end comprises an external cover constituted by a disposable elastic sleeve that copies in relief the morphology of the blade and a distal portion of the handle.

Particularly, 30 mm from the tip overlaps a circular lens of 0 diopters and 1 mm thick, which fits on the edge of the 10 mm diameter lens of the micro camera, isolating the area of the lens that is free of disposable elastic sleeve material.

Also particularly, the disposable elastic sleeve is made of synthetic latex.

DETAILED DESCRIPTION OF THE INVENTION

Figure 1:
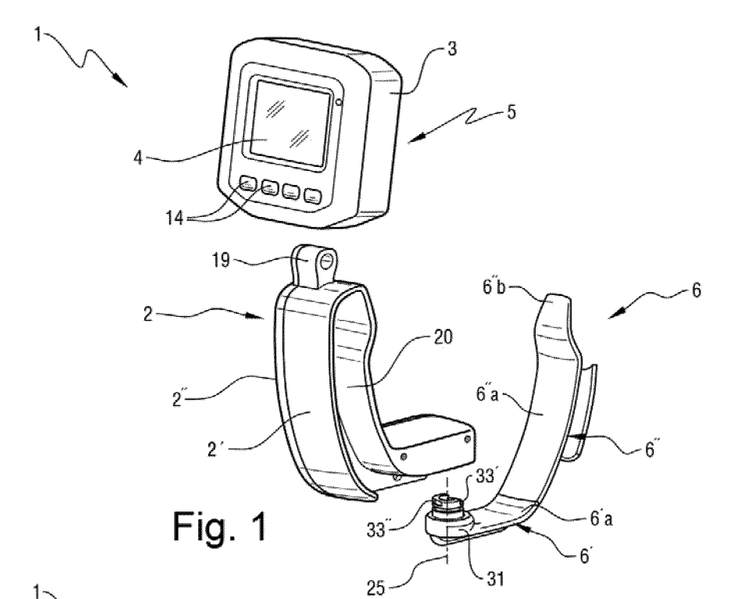
FIG. 1 shows an exploded view of a preferred embodiment of a video laryngoscope according to the present invention.
Figure 2:
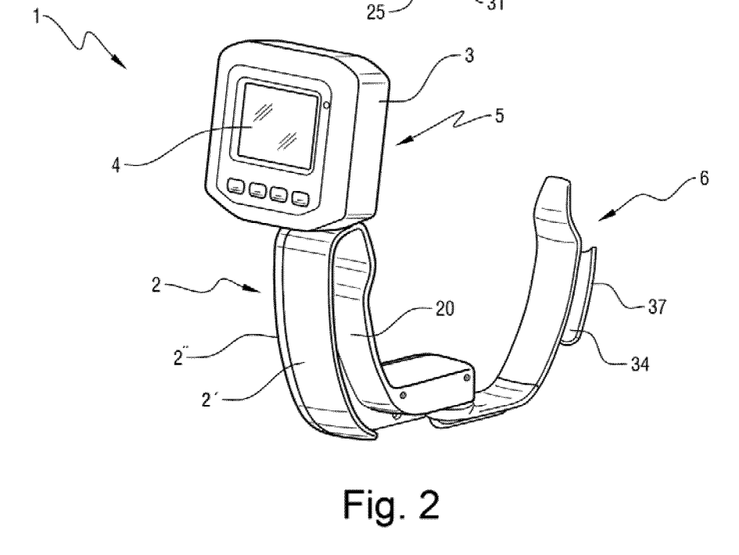
FIG. 2 shows a perspective view of the preferred embodiment of the video laryngoscope of FIG. 1, wherein the blade is deployed along the axis of symmetry of the device.

The present invention overcomes the shortcomings of the prior art mentioned above by providing a video laryngoscope (1) comprising the combination of a substantially curved handle (2) supporting a chassis (3) with a screen (4) forming a monitor (5), an extendable-retractable laryngeal blade (6) in whose support is housed a video micro camera (7), and an elastic disposable sleeve (8) covering the blade (6) and the handle (2).

In this description, it is considered that the front of the video laryngoscope (1) is the position where the operator holds the handle (2) and can watch the screen (4) of a monitor (5) of the video laryngoscope (1).

In addition, everything that refers to such position is considered proximal. Therefore, posterior and distal refer to the reverse position of the aforementioned video laryngoscope (1). Finally, a configuration of a preferred embodiment of a video laryngoscope according to the present invention for a right-handed operator is described below, which can be inverted without departing from the purpose of the invention for a left-handed operator.

Figure 12:
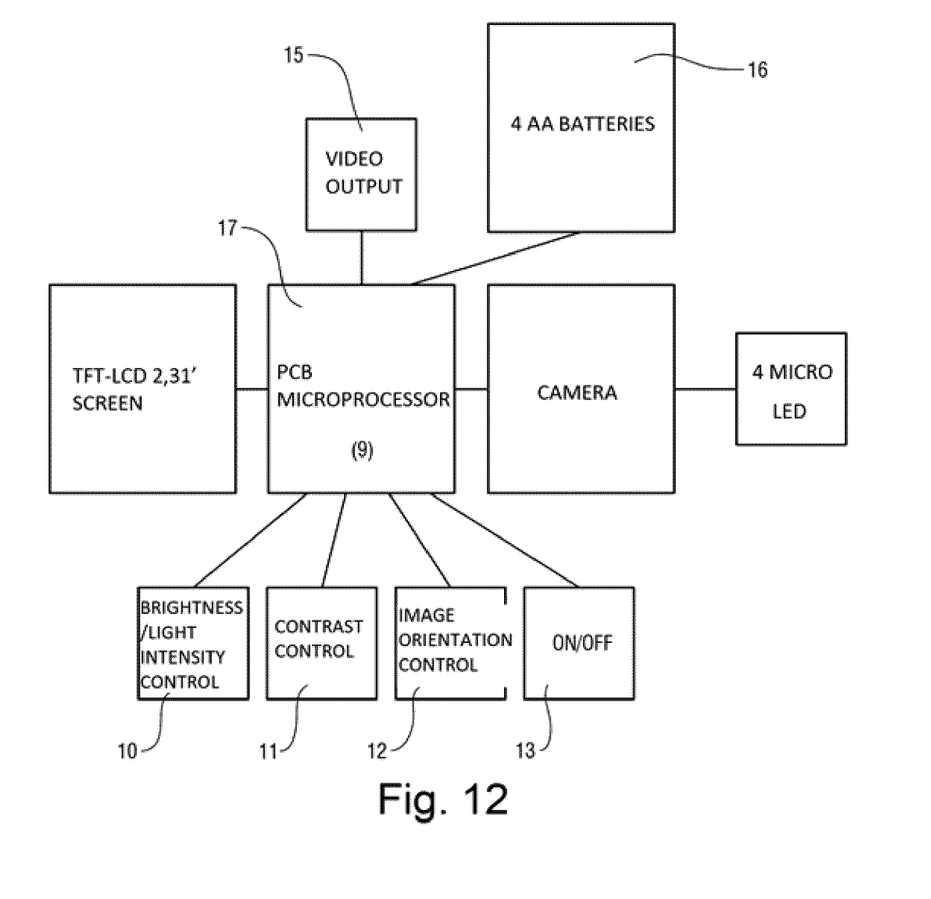
FIG. 12 shows a block diagram of an electronic circuit of a preferred embodiment of the video laryngoscope according to the present invention.

In a preferred embodiment, at the proximal end of the handle (2) a monitor (5) chassis (3) is mounted, which includes inside it: a 2.31" (approximately 5.8 cm) TFT-LCD screen (4) covered by an approximately 1.5 mm-thick protective plate preferably made of polycarbonate. The 2.31" TFT-LCD screen (4) is connected to a printed circuit board (9) (PCB, Printed Circuit Board) comprising: a plurality of image-adjustment controls (10, 11, 12), and an on/off switch (13) connected respectively to four push-buttons (14) sticking out through chassis (3) of the monitor (5), the printed circuit board also including a video output port (15) and being connected to at least one power source (16), preferably four disposable AA-type lithium batteries or rechargeable AA-type lithium ion batteries located on the back of the display. On the back of the monitor (5) there is a housing for the articulation with the handle (2) of the video laryngoscope (1). The monitor (5) is connected to the micro camera (7), which, with its own light can illuminate, watch, photograph and record real-time video images, thus being used in various specialties such as anesthesiology, emergentology, pathology, diagnosis, intensive therapy and, above all, otorhinolaryngology.

In a preferred embodiment of the present invention, the printed circuit board (9) comprises a microprocessor (17), which is connected to the power source (16), to the micro camera (7) that has associated micro LEDs for lighting, to the screen (4) of the monitor (5) of the video laryngoscope (1), to a video output (15) to send the information captured by the micro camera (7) to an external device, wherein said microprocessor (11) is controlled by a push-button panel to control a light intensity and brightness dimmer, a contrast control (11) an image orientation control (12), and an on/off switch (13).

In a preferred embodiment of the video laryngoscope (1) according to the present invention, the handle (2) consists of two parts that can be made of aluminum or aluminum alloy, for example 7075-aluminum alloy (Zicral alloy), said parts being preferably manufactured by injection or machined from a solid body, for example, with a computer numerical control lathe (CNC lathe). These two parts that make up the handle (2) are: the handle itself (2') and a left-side handle cap (2") for handling of the video laryngoscope (1) of the present invention.

Figure 5:
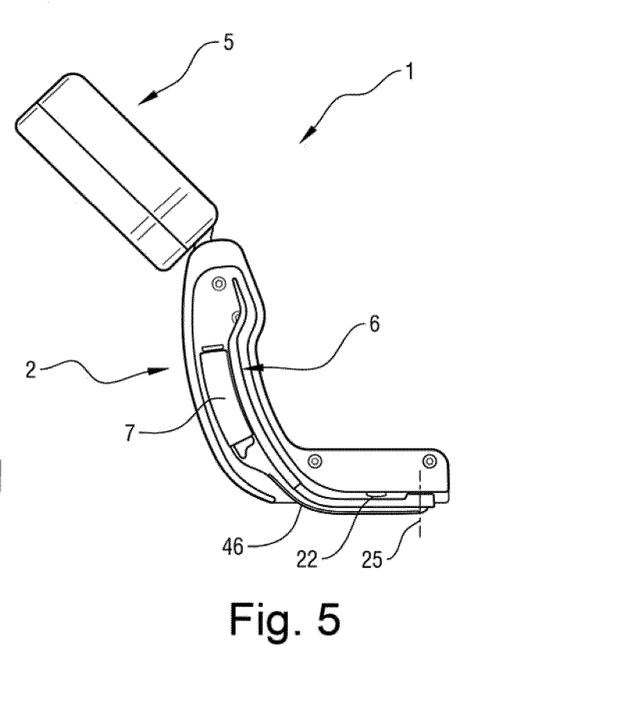
FIG. 5 shows a side view of the preferred embodiment of the video laryngoscope of FIG. 1, wherein the blade is folded inside the handle of the device and the monitor is turned towards the front.

The handle (2) at its proximal end is hingedly attached to the rear side of the monitor (5) through an articulated rotary coupling (19) on a hollow axis (19), which connects it to said housing of the monitor (5). This mechanism has a 60° mobility in the anteroposterior direction of the monitor (5), and comprises interposed between the articulated rotary coupling (19) of the handle (2) and its respective housing on the rear side of the monitor (5), traversed by the hollow axis (19), two O-ring circular seals with an internal diameter of approximately 7 mm and a wire diameter of approximately 1.78 mm to support movement of the monitor (5) and providing sufficient strength to the connection.

Figure 3:
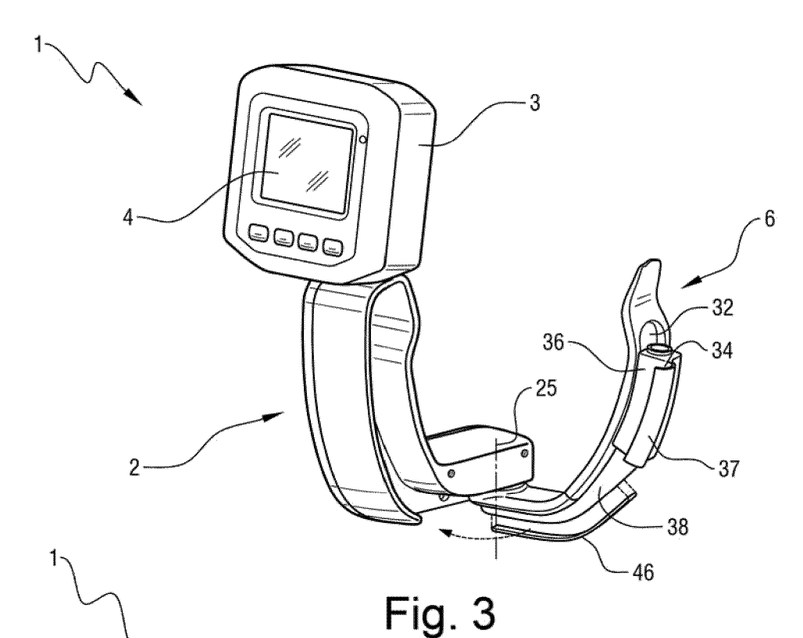
FIG. 3 shows a perspective view of the preferred embodiment of the video laryngoscope of FIG. 1, wherein the blade is shown at 90° with respect to the axis of symmetry of the device during its folding inside the handle.
Figure 4:
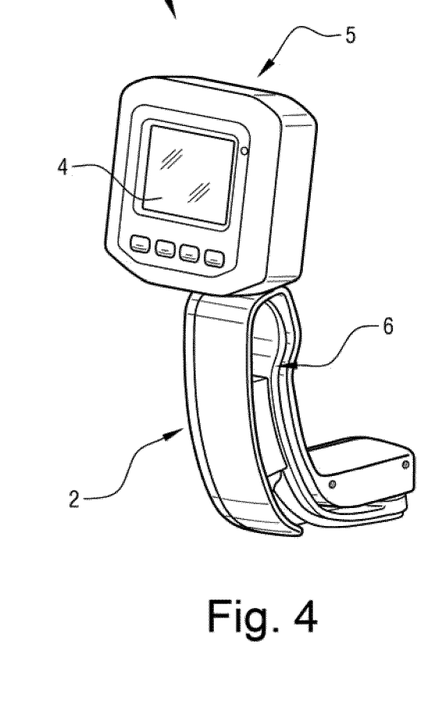
FIG. 4 shows a perspective view of the preferred embodiment of the video laryngoscope of FIG. 1, wherein the blade is folded inside the handle of the device.

The handle (2) comprises an internal cavity (20) open along its entire length on its right side, wherein said cavity (20) houses the blade (6) of the laryngoscope when folded over the handle (2). Preferably, the position is fixed by means of an automatic locking mechanism (21) with a lock connected to an actuation button (22) at the distal end of the handle (2) on its lower side. This actuation button (22) releases the T-shaped automatic lock (23) when the blade (6) is deployed over the handle (2). When the blade (6) is folded, it can be opened or rotated 180° around the axis of symmetry of the handle (2) opening and unfolding like a penknife blade.

Figure 8:
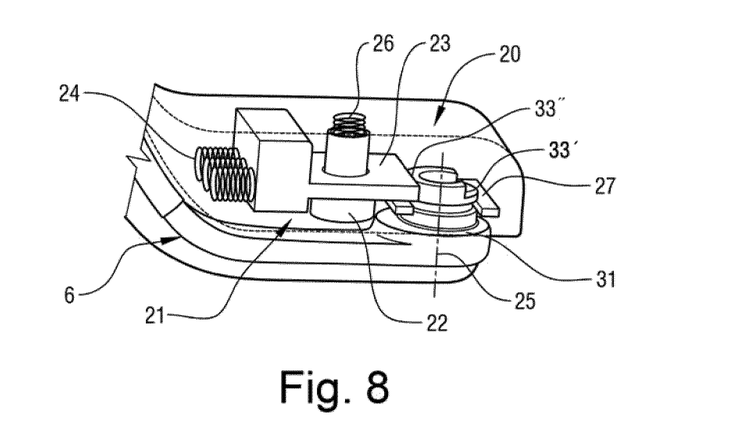
FIG. 8 shows a detail of a lock locking mechanism of the blade on the handle of a preferred embodiment of the video laryngoscope according to the present invention.

In a preferred embodiment, over the left end of the handle (2), and at its distal end there is a cavity housing the automatic locking mechanism (21) of the blade (6) composed of the lying down T-shaped automatic lock (23) and connected on its proximal end with three springs (24) of approximately 6 mm in diameter and approximately 16 mm in length and which is connected at its distal end to the pivot axis (25) of the blade (6). This lying down T-shaped automatic lock (23) is penetrated by an upper piston-shaped lock externalized below on the handle (2) as a push-button (22) activating the mechanism and which is connected on its upper end to a spring (26) approximately 5 mm in diameter and approximately 15 mm in length. The pivot axis (25) of the blade (6) is locked by a Seeger U-lock (27). The handle (2) preferably has a channel (18) for the passage of a cable (29) of the micro camera through it, from the blade (6) to the monitor (5).

Preferably, the piston-shaped lock and the actuation button (22) are made of AISI 420, 316 L, 304, 303 Full Hard or ¾ Hard steel, and the automatic lock (23) has a lying down "T"-shaped automatic lock and the "U"-lock are made of AISI 303 Full Hard o ¾ Hard steel. In addition, the springs (24, 26) are made of AISI 303 or 308 steel.

The handle (2") cap has a hemichannel on its right side corresponding to a hemichannel on the left side of the handle (2'). The handle (2) is screwed to the handle (2) cap overlapping both hemichannels creating a channel (18) carrying the cable (29) of the micro camera (7) from the handle (2) articulation with the blade (6) to the chassis articulation (3) of the monitor (5) with said handle (2). Said cap (2") is screwed to the handle (2') by means of multiple screws (30) for example, M3×0.5 Allen screws, and flat head screws in such a way that, after assembly, they are imperceptible to the eye and to the touch, especially after the application of paint, preferably epoxy paint, on the handle (2).

Esta pintura This final preferred epoxy paint is non-toxic and approved for use by the Food and Drug Administration (FDA).

Figure 11:
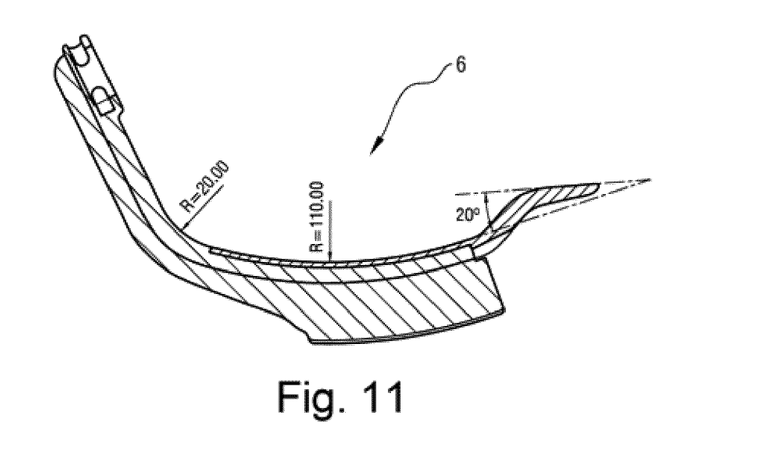
FIG. 11 shows a side section of the blade of a preferred embodiment of the video laryngoscope according to the present invention, indicating the radii of curvature and angle of the biomechanical/technical pattern characteristic of its design.

In a preferred embodiment, the blade (6) of the video laryngoscope (1) comprises two structures, a movable blade (6') support and the movable blade (6") itself coupled one on top of the other by means of a curved slide (32) that only allows a longitudinally displacement of one over the other. In turn the blade (6) is divided into three regions, respectively from a proximal to a distal position, the blade arm (6'a), blade body (6"a) and end or tip of the blade (6"b). The movable blade support (6') has from the proximal to the distal end and on its upper side, the pivot axis (25) on a circular plate (31) being this plate (31) the proximal end of the blade (6') support arm and continuing this support (6') towards the distal end by the curved slide (32) with a radius of curvature of approximately 20 mm being formed between them. The curved slide (32) has a radius of curvature of approximately 110 mm integrated to the movable blade (6"), forming the blade body (6"a) of the movable blade (6"). Said pivot axis (25) of the movable blade (6') support is hingedly attached to with the handle (2) through a rotating mechanism allowing a 180° rotation composed of the automatic lock (21) and the lock exteriorized as the actuation button (22) having this pivot axis (31) two slots (33', 33") opposite to each other, a deeper slot (33') connected to the extended blade (6) and a shallower slot (33") connected to the folded blade (6).

Figure 9:
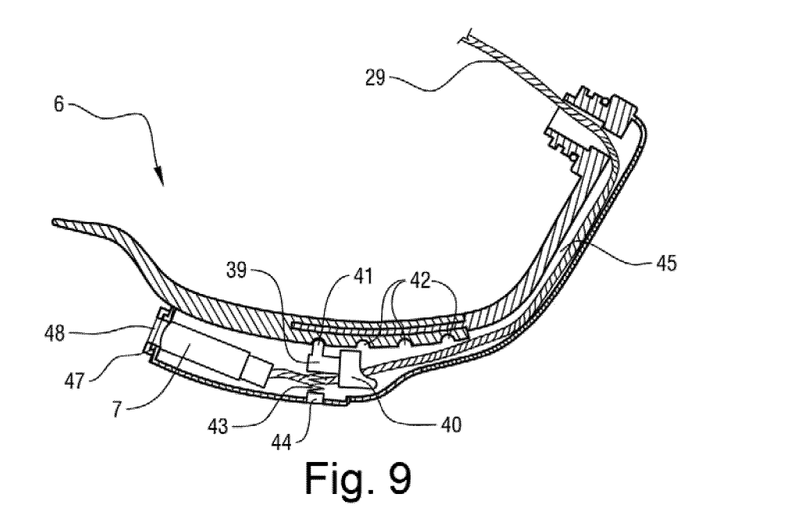
FIG. 9 shows a detail of a side sectional view of the blade of a preferred embodiment of the video laryngoscope according to the present invention, the lock of the extension-retraction mechanism of the movable blade, with the micro camera mounted and the cable path connecting it to the monitor's electronic board.

At the distal end of the movable blade (6') support and on its lower side opposite to the slide (32), a high-definition micro video camera (7) is housed together with a plurality of micro LEDs, preferably four high power and adjustable intensity LEDs, preferably having this micro camera (7) a 0° viewing direction angle, a 48° angle of view or FOV (Field of View) and a 30 and 80 mm DOF (Deep Of Field) fiber optic lighting and direct vision of the operator.

As described above, the laryngeal blade (6) comprises two structures, the movable blade (6') support and the movable blade (6") with its chiseled distal end (6"b). In order to achieve a better and appropriate exposure of the anterior commissure, the laryngeal blade (6) follows a biomechanical/technical pattern characterized by a protrusion-like bulge of the tip (6"b) followed by a bending at an angle of approximately 20° between approximately 20 mm terminals of this tip of blade (6"b) and a line joining the end of said tip 6"b) towards the body of the movable blade (6"a) with an approximate 110 mm upper radius of curvature. With this design, instead of the lever forces being exerted on the inner side of the thyroid cartilage or on the vallecula bed, also called glossoepiglottic recess, these forces are mainly exerted on the hyoid/base of the tongue complex, resulting in the rising of this complex and, as a consequence of this, a relative decrease of the thyroid cartilage and therefore of the anterior commissure, there being no need to perform external compression maneuvers on the thyroid cartilage area, as is usually done, to improve glottic exposure.

Figure 7:
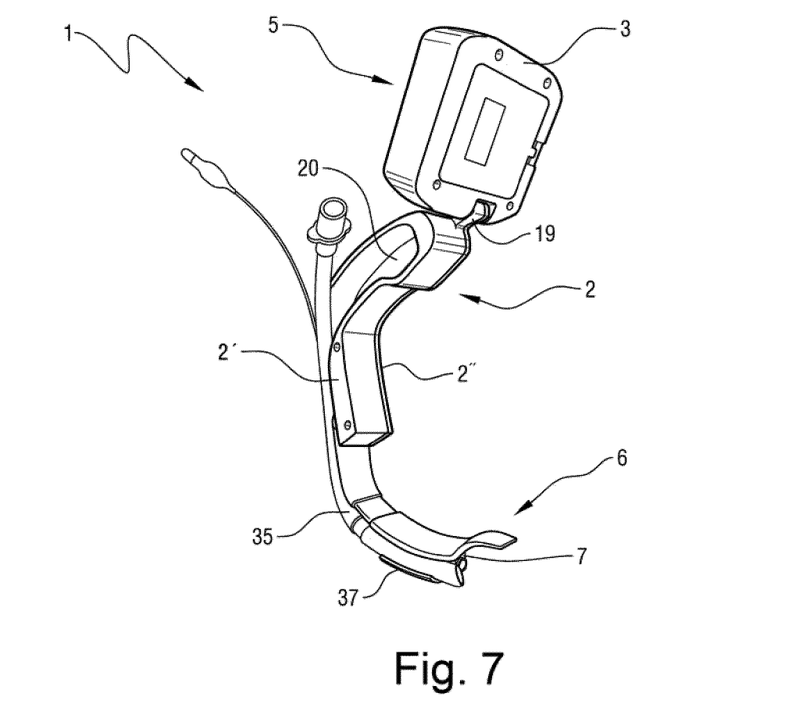
FIG. 7 shows a perspective view from the right side of a preferred embodiment of the video laryngoscope according to the present invention, showing the semi-extended deployed blade and an endotracheal tube in working position.

The movable blade (6') support has on its right side, a channel (34) for the passage of an endotracheal tube (35) during the operation of the video laryngoscope (1) according to the present invention. The channel (34) is formed by the movable blade (6') support, the slide (32) and the movable blade (6") above, on the right side (36) of the housing of the micro camera (7) on the left, and below by a semi-circular cross section flap (37) an extension of the lower side of the housing of the micro camera (7). Said channel (34) for the endotracheal tube (35) allows the assembly and disassembly of these tubes on the right side of the video laryngoscope (1) and has a height of approximately 13 mm and can house up to an endotracheal tube No. 9.

On the left side (38) of the movable blade (6') support, at its distal end, which is also the left wall of the housing of the micro camera (7), it extends towards the proximal end by a lock (39) of an extension-retraction mechanism of the movable blade (6") consisting of a trigger (40) connected through an intermediate pin (41) to an internal cylindrical lock (39) with an axial up and down movement perpendicular to the slide (32) and movable blade (6"), this lock (39) being connected on its upper end to four flat hollow slots (42) arranged on the lower side of the movable blade (6") to adjust the length of the blade (6) and which is connected on its lower end to a spring (43) approximately 4.5 mm diameter and approximately 7 mm length, being this spring (43) connected to a threaded cap (44) to seal the housing of the lock (39) on its lower side. Inside this lock (39) mechanism, the housing of the micro camera (7) extends towards the proximal end by a channel (28) of the cable (29) of the micro camera (7) on its left side. The movable blade (6') support on its lower side has a linear slot all along the channel (28) of the cable (29) which is sealed by a cap (46) integrated to this slot that is welded, preferably by means of the PUK micro TIG, TIG or MIG system.

In a preferred embodiment, the movable blade (6') support has a M10×1 internal threading on the initial 5 mm portion of the distal end of the housing of the micro camera (7), being the hollow cap (47) integrated to this thread as a threaded bushing with an external diameter of approximately 10 mm and approximately 8 mm internal diameter, having in its last millimeter in length an internal diameter of 7.5 mm, having a length of approximately 5.5 mm, being of these approximately 5.5 mm 4.5 mm threaded with a M10×1 thread.

After installing the micro camera (7) and cementing such camera with resin for tightness, the hollow cap (47) is screwed on by cementing it with cyanoacrylate resin (Loctite), epoxy resin, polyurethane resin or, preferably, it is fixed with PUK or micro TIG welding points. The movable blade (6") bent at its tip (6"*b*), a biomechanical pattern that causes a change in the points and vectors of application of forces from the video laryngoscope (1) towards the larynx and surrounding tissues, precisely on the area of the base of the tongue and hyoid through a protrusion of the tip followed by a terminal bending of this tip 6"*b*) approximately 20 mm in length with an angle of approximately 20° between the tip of the blade (6"*b*) and the body of the movable blade (6"*a*) with a upper radius of curvature of approximately 110 mm, unlike all known laryngoscopes which have a damaging tip as their main force vector. This causes the rising of the base of the tongue and a relative descent of the laryngeal crown, apart from being its anatomical structures with no stress and with less trauma to laryngeal and perilaryngeal tissues, thus optimizing the endotracheal intubation procedure from all angles, either from a substantial reduction in the times used to essentially less trauma to the patient. This bending achieves a better and excellent exposure of the endolarynx, because with this design instead of exerting lever forces on the inner face of the thyroid cartilage or vallecula bed, also called glossoepiglottic recess, these forces are exerted mainly on the hyodes/base of the tongue complex, which is why rising of this complex is achieved and, as a result of this, a relative descent of the thyroid cartilage and the entire laryngeal crown, there being no need to perform external compression maneuvers on the thyroid cartilage area, as is usually done, to improve glottic exposure and also decreasing the use of stylets such as the Eschmann guide.

Preliminary anthropometric data on random samples revealed that the distance between the midpoint of the hyoid bone and the midpoint of the thyroid cartilage on the anatomical midsagittal plane in adults is on average approximately 21.6 mm, being 17.8 mm+/−2.7 mm in adult women, and 22.5 mm+/−6.6 mm in adult men, values subject to height and racial variations.

These anthropometric data also revealed that, in the midsagittal plane of the human larynx, the angle formed by the anterior edge of the thyroid cartilage with the axial cephalo-caudal axis of the laryngeal cylinder, i.e. axis perpendicular to the base of the cricoid ring, is on average approximately 24.1°, being 22°+/−6° in adult women, and 25.7°+/−8.5° in adult men, values subject to height and racial variations. Therefore, the bent at the distal end of the tip of the laryngeal blade (6"*b*) of the video laryngoscope (1) according to the present invention, is coupled integrally with the epiglottis, deflecting it and supporting it on the angle of the thyroid cartilage notch and on the hyoid bone given its great flexibility. As an alternative technique, the epiglottis can be deflected indirectly, that is, by not loading it, through pressure on the hyoepiglottic ligament, in order to transmit the lever forces from the upper side of the laryngeal valve, from its protuberance, to the base of the tongue and the hyoid bone. This is completely different from what occurs with laryngoscope designs prior to the present invention, wherein most of the forces are transmitted to the thyroid cartilage or vallecula bed from the potentially damaging tip of the laryngeal valve. Said tip of the blade (6"*b*) facilitates the intubation technique since, in the face of this relative drop of the laryngeal crown, the larynx is better exposed and with less tension on its tissues for the passage of the tracheal tube (35).

Figure 6A:
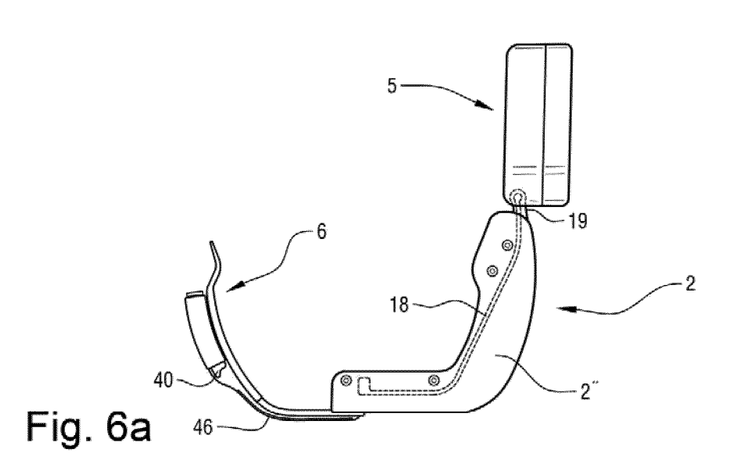
FIG. 6a shows a left side view of a preferred embodiment of the video laryngoscope according to the present invention, showing the blade deployed without extending. For viewing the path of the channels where the micro camera cable is installed along the handle and the movable blade holder, the cable is not shown.
Figure 6B:
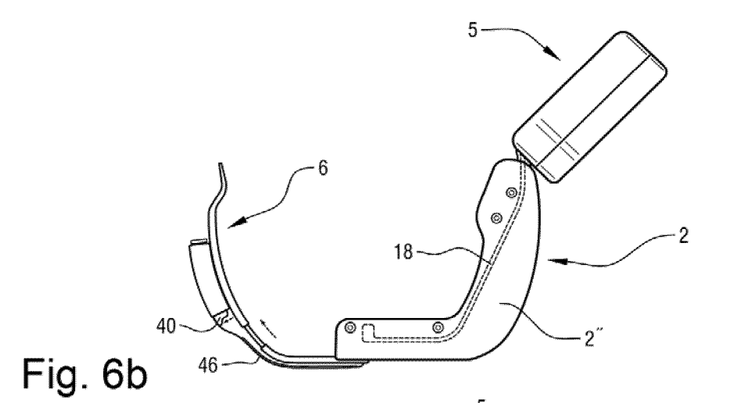
FIG. 6b shows a left side view of a preferred embodiment of the video laryngoscope according to the present invention, showing the deployed blade while being extended. For viewing the path of the channels where the micro camera cable is installed along the handle and the movable blade support, the cable is not shown.
Figure 6C:
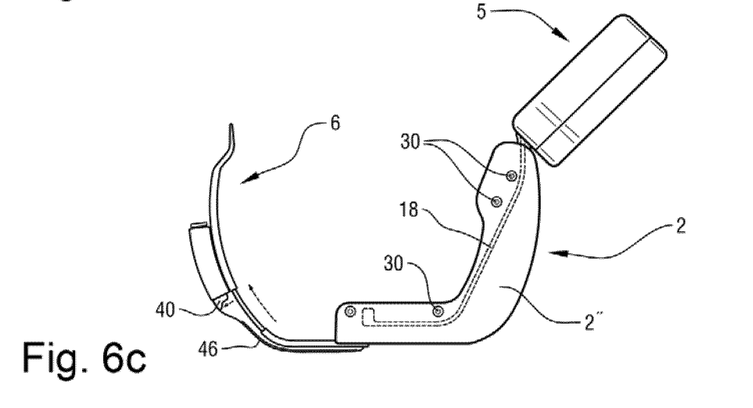
FIG. 6c shows a left side view of a preferred embodiment of the video laryngoscope according to the present invention, showing the fully extended deployed blade. For viewing the path of the channels where the micro camera cable is installed along the handle and the movable blade support, the cable is not shown.

The extendable-retractable curved blade (6) of the video laryngoscope (1) according to the present invention, is deployed or folded on the slide (32) of the movable blade (6') support by means of the lock (39) and trigger (40) mechanism of easy manual operation previously described, with which four lengths of the blade (6) can be achieve every approximately 10 mm, being compatible, for example, with Macintosh 2, 3 and 4 blades, thus eliminating the need to exchange these three types of blades of different lengths according to the anthropometry of the patient. In addition, this blade (6) is compatible with the Macintosh 1 blade if the operator does not introduces it completely. Therefore, the video laryngoscope (1) according to the present invention is compatible with Macintosh 1, 2, 3 and 4 blades in relation to the length of the blade (6).

Preferably, the extendable-retractable movable blade (6") as well as its support (6') are made of AISI 420, 316 L and 304 steel. In addition, the lock (39) of the blade (6), horizontal pin (41) and lock (40) trigger are made of AISI 420, 316 L, 304, 303 Full Hard or ¾ Hard steel, and the spring is made of AISI 303 or 308 steel.

Regarding the angulation of the blade (6), the same is adjusted once the blade body (6"*a*) and its end (6"*b*) is introduced in the patient's airway and depending on the degree of introduction of the blade arm (6'*a*). This highlights the video laryngoscope (1) according to the present invention during its operation in the so-called difficult airway, where generally an angulation of the movable blade (6") is required and not the blade (6) length, so by introducing maximally the blade (6) over the oropharynx, it is possible to achieve a significant angulation of said blade (6). Thus, a better performance of this video laryngoscope is achieved (1) compared to Storz's C-Mac video laryngoscope with its D-Blade for difficult airways.

Figure 10:
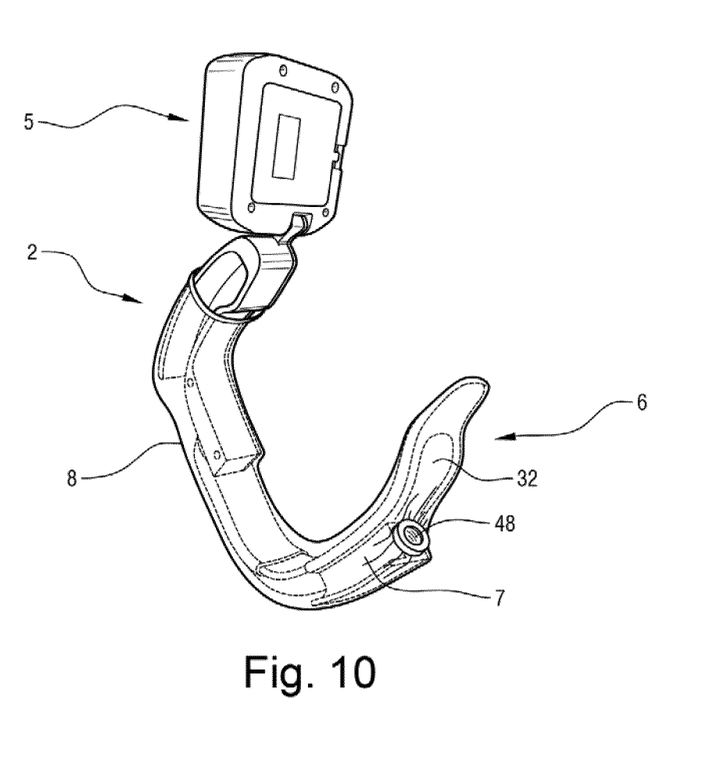
FIG. 10 shows a perspective of a detail of an installed disposable elastic sleeve wrapping the blade and a distal portion of the handle of a preferred embodiment of the video laryngoscope according to the present invention.

Finally, the video laryngoscope (1) of the present invention is used together, and if necessary with a disposable elastic sleeve (8), preferably made of synthetic latex. This elastic sleeve (8) has a length of approximately 280 mm and an approximate thickness between 50 and 200 microns, with a thickness of 150 microns being preferred and, when mounting this sleeve (8) on the distal end of the video laryngoscope (1) of the present invention, approximately 30 mm from the tip a 0 diopters (48) and approximately 1 mm thick lens is placed, preferably made of injected polycarbonate, shaped like a cap that fits over the rim of the lens of the micro camera (7) approximately 10 mm in diameter.

In this way, the lens (48) itself shaped like a cap with approximately 11 mm internal diameter and walls approximately 1 mm wide and approximately 2 mm high, is fitted over the internal ring of approximately 10 mm internal diameter and walls approximately 4 tenths thick.

The assembly is carried out by overlapping the rings in such a way that the elastic sleeve (8) is fixed between the two parts after intussuspection of the inner ring inside the lens (48), then the excess elastic material from the sleeve (8) found on the lens (48) is removed leaving it ready to clearly capture images during airway management.

More preferably, the aforementioned elastic sleeve (8) copies in relief the morphology of the blade (6) and of the handle (2) of the video laryngoscope (1) according to the present invention.

The invention claimed is:

1. A video laryngoscope for airway management of an individual in need thereof, wherein the video laryngoscope comprises:
   a substantially curved handle that comprises an internal cavity with an opening along the entire length on one of its sides and a cap on the opposite side, said cavity housing a video laryngoscope blade when it is folded over the handle and the blade includes a movable blade support that is rotatably mounted to articulate 180° relative to the handle about a pivot axis, the movable blade support houses an automatic locking mechanism of the blade;
   the blade further includes a movable blade overlappingly connected to the movable blade support by means of a longitudinal slide, said movable blade being movable along said longitudinal slide by actuating a lock of an extension-retraction mechanism of the movable blade;
   a monitor that includes a monitor chassis with a screen, the screen is covered by a protective plate, the screen being connected to a printed circuit board that is connected to a plurality of image-adjustment controls and an on/off switch; and
   the monitor is connected to a camera arranged at a distal end of the movable blade support and on a lower side of the movable blade support opposite the longitudinal slide.

2. The video laryngoscope according to claim 1, wherein when the blade is deployed from the internal cavity of the handle, the position is fixed by the automatic locking mechanism with a lock released by means of an actuation button arranged at a distal end of the handle on a lower side thereof.

3. The video laryngoscope according to claim 1, wherein a proximal end of the movable blade support extends towards the distal end, forming therebetween a curve with a 20 mm upper radius of curvature, a central portion constituting a blade body with a 110 mm upper radius of curvature, and a tip having a protrusion-like bulge followed by a slope of 20 degrees between 20 mm terminals of the tip and towards the 110 mm upper radius of curvature of the blade body.

4. The video laryngoscope according to claim 1, wherein the movable blade support comprises on its lower side a slot on a channel that receives a cable of the camera, and the slot is sealed by a cap welded to said slot.

5. The video laryngoscope according to claim 1, wherein the lock of the extension-retraction mechanism of the movable blade comprises an actuation trigger connected through an intermediate pin to an internal cylindrical lock with an axial up and down movement perpendicular to the longitudinal slide and movable blade, said lock being connected on an upper end thereof to four flat hollow slots arranged on a lower side of the movable blade to adjust the length of the blade and connected on a lower end thereof to a spring, the spring being connected to a threaded cap to seal a housing of the lock.

6. The video laryngoscope according to claim 1, wherein the printed circuit board comprises a mounted microprocessor connected to a power source, the camera, the screen, and to a video output port to send the information captured by the camera to an external device, wherein said microprocessor is controlled by a button panel that includes the image-adjustment controls and the on/off switch.

7. The video laryngoscope according to claim 1, wherein the handle includes a channel for the passage of a cable connecting the camera to the screen.

8. The video laryngoscope according to claim 1, wherein the camera is a high-definition video camera comprising a plurality of adjustable intensity light emitting diodes.

9. The video laryngoscope according to claim 8, wherein the camera has a 0° direction angle of view, a 48° angle of view or FOV (Field of View) and a 30 and 80 mm DOF (Deep of Field).

10. A video laryngoscope comprising:
    a curved handle having an internal cavity with an opening along an entire length on a side the curved handle and a cap on an opposite side of the curved handle, the internal cavity is configured to house a video laryngoscope blade;
    a video laryngoscope blade having a folded position within the internal cavity and an extended position outside the internal cavity, the video laryngoscope blade includes a movable blade support that is rotatably mounted to the curved handle to allow the movable blade support to articulate relative to the curved handle about a pivot axis between the folded position and the extended position, the movable blade support includes an automatic locking mechanism that is configured to lock the video laryngoscope blade at the extended position;
    the video laryngoscope blade further includes a movable blade movably connected to the movable blade support by a longitudinal slide, the movable blade being movable along the longitudinal slide by actuating a lock of an extension-retraction mechanism of the movable blade;
a monitor attached to the curved handle, the monitor includes a monitor chassis with a screen, the screen is covered by a protective plate, and the screen is connected to a printed circuit board that is connected to a plurality of image-adjustment controls and an on/off switch; and
a camera mounted on the movable blade support, the camera is connected to the screen.

11. The video laryngoscope according to claim 10, wherein the automatic locking mechanism includes a lock with an actuation button arranged at a distal end of the curved handle.

12. The video laryngoscope according to claim 10, wherein the video laryngoscope blade includes a blade arm at a proximal end thereof, a tip at a distal end thereof, and a blade body between the blade arm and the tip.

13. The video laryngoscope according to claim 10, further comprising a cable connected to the camera; the movable blade support comprises a slot that receives the cable; and a cap closes the slot.

14. The video laryngoscope according to claim 10, wherein the lock of the extension-retraction mechanism of the movable blade comprises a trigger connected through an intermediate pin to an internal cylindrical lock, and a spring engaged with the intermediate pin; and comprising slots arranged on the movable blade; and the intermediate pin is engageable with the slots.

15. The video laryngoscope according to claim 10, wherein the printed circuit board comprises a microprocessor connected to a power source, the camera, the screen, and to a video output port; and comprising a button panel connected to the microprocessor, the button panel includes the image-adjustment controls and the on/off switch.

16. The video laryngoscope according to claim 10, wherein the curved handle includes a channel; and further comprising a cable connecting the camera to the screen, the cable being disposed in the channel.

17. The video laryngoscope according to claim 10, wherein the camera comprises a video camera with a plurality of light emitting diodes.

18. The video laryngoscope according to claim 17, wherein the camera has a 0° direction angle of view, a 48° angle of view or FOV (Field of View) and a 30 and 80 mm DOF (Deep of Field).

* * * * *